United States Patent [19]

Yokoyama

[11] Patent Number: 4,598,019

[45] Date of Patent: Jul. 1, 1986

[54] METHOD FOR SURFACE TREATMENT OF POWDERY AND GRANULAR MATERIAL STORED IN OPEN AIR

[75] Inventor: Nobuo Yokoyama, Yokohama, Japan

[73] Assignee: Nippon Oil Company, Ltd., Japan

[21] Appl. No.: 678,462

[22] Filed: Dec. 5, 1984

[30] Foreign Application Priority Data

Dec. 6, 1983 [JP] Japan ................. 58-230098

[51] Int. Cl.$^4$ ............ B32B 27/14; B32B 11/04; C08L 91/06
[52] U.S. Cl. .................. 428/407; 524/275; 524/276; 524/277; 524/475; 524/487; 524/488; 524/489; 524/522; 524/524; 524/556; 524/563
[58] Field of Search ......... 524/487, 488, 275, 276, 524/277, 522, 524, 556, 563, 475, 489; 428/407

[56] References Cited

U.S. PATENT DOCUMENTS 3,616,106 10/1971 Moyer .................. 524/488
3,912,674 10/1975 Stahl ................. 524/524 X
3,919,149 11/1975 Cushman et al. ......... 524/489 X
4,439,563 3/1984 Sackis et al. ............ 524/96

Primary Examiner—Theodore E. Pertilla
Attorney, Agent, or Firm—Ostrolenk, Faber, Gerb and Soffen

[57] ABSTRACT

The present invention is directed to a method for surface treatment characterized by making use of a surface treating agent, for a powdery and granular material stored in the open air, containing 0.5 to 50% by weight of a solid content as an essential component and a residue which is water, said solid content comprising (I) 100 parts by weight of a petroleum wax component selected from the group consisting of slack waxes containing 1% by weight or more of an oil content, slack microcrystalline waxes including 1% by weight or more of an oil content, paraffin waxes, microcrystalline waxes and their mixtures and (II) 5 to 500 parts by weight of a polymer component having adhesive properties and the lowest film-forming temperature of 40° C. or less.

17 Claims, No Drawings

METHOD FOR SURFACE TREATMENT OF POWDERY AND GRANULAR MATERIAL STORED IN OPEN AIR

BACKGROUND OF THE INVENTION (1) Field of the Invention

The present invention relates to a method for the surface treatment of a powdery and granular material stored in the open air which makes use of an aqueous emulsion type surface treating agent, and according to this method, a film is formed on the surface of the powdery and granular material stored in the open air to prevent the dusting, deterioration, outflow and destruction of the particle material and to inhibit the increase of water content owing to rainfall.

(2) Description of the Prior Art

Powdery and granular materials such as coals, ores, earths and sands are often stored in a large amount in the open air. Therefore, such field-stored materials are apt to dusting, outflow and destruction and tend to cause environmetal pollution. Furthermore, in such a case, there are many problems such as a quality deterioration due to the weathering and heat generation of the powdery and granular materials and an increase of water content therein resulting from rainfall, which requires energy to restore the dry condition. Accordingly, in order to overcome such problems regarding the open-air storage of the powdery and granular materials, researches have been conducted on a variety of methods for the surface treatment of the stored materials (for example, "Sentan", Vol. 7, 1957, p. 300 and Japanese Patent Provisional Publication No. 109557/1983). However, for reasons of economy and inadaptability to a use of the powdery and granular material, those materials which can be actually utilized as surface treating agents are limited to a fairly narrow range.

Taking the role of the surface treating agent into consideration, a raw material used as the agent is required to have adhesive properties and hydrophobic nature and, most of all, to be inexpensive. The raw materials which can satisfy such requirements include petroleum fractions such as high-viscosity oil and asphalt. However, the strength of the film formed from the high-viscosity oil is not sufficient for the surface treatment, and on the other hand, the asphalt cannot display a good waterproof performance when formed into a thin coating.

The inventor of the present case has intensively made investigations with the aims of solving the above-mentioned problems regarding the surface treatment of the powdery and granular materials stored in the open air, and of overcoming the drawbacks of the known surface treating agents, and finally the present invention has been completed.

SUMMARY OF THE INVENTION

An object of the present invention is to provide a method for surface treatment which makes use of an inexpensive surface treating agent and according to the method, the surface treating agent is sprayed on powdery and granular materials stored in the open air to form a film thereon, whereby the dusting, outflow and destruction of the powdery and granular material are prevented; the increase of water content therein is controlled because of the high water repellency; and the permeation of air is blocked to inhibit oxidation and to thereby prevent the deterioration of the materials.

That is, the present invention is directed to a method for the surface treatment characterized by making use of a surface treating agent, for field-stored powdery and granular materials, including 0.5 to 50% by weight of a solid as an essential component and a residue which is water, said solid content comprising:

(I) 100 parts by weight of a petroleum wax component selected from the group consisting of slack waxes including 1% by weight or more of an oil content, slack microcrystalline waxes including 1% by weight or more of an oil content, paraffin waxes, microcrystalline waxes and their mixtures, and (II) 5 to 500 parts by weight of a polymer component having adhesive properties and the lowest film-forming temperature of 40° C. or less.

DETAILED DESCRIPTION OF THE INVENTION

Petroleum wax components (I) usable in the present invention include paraffin waxes and microcrystalline waxes. Such a wax preferably has a melting point of 45° to 85° C., because if it has a melting point of less than 45° C., a film which will be formed therefrom will be poor in strength and heat resistance, and if it has a melting point of more than 85° C., a sufficiently waterproof film will not be obtained when dried at ordinary temperature.

In the present invention, not only the refined but also the unrefined petroleum waxes are acceptable. A so-called slack wax which is a raw material of the refined wax has a color and includes an oil, therefore it is generally distinguished from the refined wax and is regarded as a low-grade material. However, the slack wax is suitable for the present invention, is inexpensive, and the oil included in the slack wax functions as a kind of plasticizer in order to permit forming, at a much lower temperature than the melting point of the wax, the continuous film excellent in waterproofness and adhesive properties. For this reason, it is fair to say that the slack wax is the most preferable raw material. For the purposes of facilitating the emulsification of the petroleum wax and forming the uniform and good film, a so-called oxygen-containing wax may be further blended with the raw materials.

The oxygen-containing waxes typically include wax oxides such as paraffin oxides and polyethylene oxides, natural waxes such as carnauba wax and montan wax, and oxygen-containing waxes prepared by reacting maleic anhydride with hydrocarbon waxes. Above all, the most preferable ones are the oxygen-containing waxes which can be prepared by carrying out an addition reaction or copolymerization of maleic anhydride with hydrocarbon waxes (mineral oil waxes such as paraffin waxes and microwaxes, synthetic waxes such as polyolefin waxes and their mixtures). Even when the oxygen-containing wax is not used, the emulsion in which an emulsifying agent is used in an amount of 3.0% by weight or less based on the weight of the wax will not reduce the hydrophobic nature of the wax component. However, when the amount of the emulsifying agent is the emulsion is in excess of 3.0% by weight to the weight of the whole wax component, the hydrophobic nature of the wax itself will tend to be lowered. In such a case, therefore, it is preferred that the oxygen-containing wax which has good emulsifying properties to the wax component and which is appreciably hydrophobic in itself is incorporated thereinto, thereby limiting the amount of the emulsifying agent to less than 3.0% by weight to the weight of the wax. The oxygen-containing waxes in which the oxygen content is within the range of about 0.5 to 15% by weight have good emulsifying properties, and among them, the oxygen-containing waxes prepared by reacting the hydrocarbon waxes with maleic anhydride can be most preferably used. An amount of the oxygen-containing wax is within the range of 2.0 to 20% by weight, preferably 3.0 to 10% by weight based on the weight of the whole petroleum wax component (I). U.S. Pat. No. 4,218,263 discloses the oxygen-containing waxes which are obtained by reacting the hydrocarbon waxes with maleic anhydride, and therefore the contents of this U.S. patent are specifically incorporated herein by reference.

When the powdery and granular material stored in the open air is sprayed with the aqueous emulsion including the above-mentioned petroleum wax, especially the aqueous emulsion in which the amount of the emulsifying agent is limited to less than 3.0% by weight based on the weight of the whole wax and in which the oxygen-including wax particularly prepared by reacting the hydrocarbon wax with maleic anhydride is contained in an amount of 2.0 to 20% by weight, preferably 3.0 to 10% by weight based on the weight of the whole wax, a film will be formed on the surface of the stored powdery and granular material, which film will have a moderate adhesion and advantageously serves to prevent the dusting, outflow and destruction of the powdery and granular material, to inhibit the increase of water content therein by virtue to its high water repellency, and to retard air permeation therethrough, thereby restraining the deterioration in the particle material owing to oxidation. However, the film formed from the wax alone is still insufficient in point of strength and is also unsatisfactory in adhesive properties, depending on its use.

With the intention of compensating these drawbacks, a polymer component (II) having adhesive properties and the lowest film-forming temperature of 40° C. or less can be added, as the second essential component, to the emulsion of the present invention. The polymer component (II) is required to be excellent in compatibility with the abovementioned petroleum wax (I) and to have ability to make a highly adhesive and strong film in the state of a mixture including the wax component. From the viewpoints of performance and cost, the usable polymer components include acrylic polymers and vinyl acetate polymers.

An amount of the polymer component (II) is within the range of 5 to 500 parts by weight, preferably 15 to 400 parts by weight, based on 100 parts by weight of the wax component (I).

Further, a solid content mainly comprising the components (I) and (II) in the emulsion is within the range of 0.5 to 50% by weight, preferably 2 to 35% by weight.

The aqueous emulsion containing the components (I) and (II) may be prepared by melting and mixing the respective solid components and adding hot water thereto in order to emulsify them, or by mixing aqueous emulsions with each other which have separately been made previously. Anyway, a significant difference in performance will not be observed between the above two methods.

For spraying the emulsion on the stored powdery and granular material to form the film thereon, the concentration of the solid content can be suitably adjusted in compliance with its use so as to permit regulating an amount of the film and the physical properties such as viscosity which has influence on workability. Therefore, the concentration of the solid content in the emulsion can be optionally decided at its use within the range of 0.5 to 50 parts by weight, preferably 2 to 35 parts by weight, as mentioned above. However, the higher the concentration of an undiluted original emulsion is, the more convenient it is. Accordingly, it is preferred that the original emulsion is stored in high concentration not exceeding a level of 50% by weight which is the upper limit with a usual emulsifying technique and the original emulsion will afterward be diluted to a desired concentration at its use.

In preparing the concentrated emulsion in which the solid content is contained in an amount of 40% by weight or more, it is undesirable that the amount of the polymer component (II) deviates from the range of 5 to 500 parts by weight based on 100 parts by weight of the petroleum component (I). The reason is that if the amount of the component (II) deviates from the abovementioned range, various disadvantages will occur. For example, the viscosity of the concentrated emulsion will be too high, with the result that work efficiency will be lowered; the water repellency of the formed film will be poor; and the solid content may choke the pipes or nozzles of a spray equipment and may be difficult to remove.

Now, the present invention will be further described in detail in accordance with examples, but they are not intended to limit the scope thereof.

Evaluations referred to in the examples were made in the following manners:

(Test of Waterproofness)

An emulsion was sprayed on a piled powdery and granular material in a small amount of 40 g, and the formed film was sufficiently dried. Afterward, 40 cc of water were sprayed thereon. Weight of the piled material was measured twice before and after the water spray, and the weight of the permeated water was calculated in terms of percentage by weight to 40 g of the powdery and granular sample.

Further, water repellency on the surface of the film was evaluated by observing its surface state when water was sprayed thereon. The evaluation of the water repellency was ranked by expressions of "better", "good", "modest" and "poor" in order of excellence. The evaluation "better" means the state that water ran rolling on the surface of the piled material in the form of spherical droplets, and the evaluation "poor" means the state that the surface of the film was as wet with water as on the untreated surface of the material.

(Test of Water Resistance)

After the above-mentioned test of waterproofness, water was sprayed on the piled material. A rate of the water spray was within the range equivalent to 800 to 1,200 mm/min of rainfall and the spray operation was carried out for 10 to 15 minutes so that the fall of the water was 1,500 mm. The thus wetted material was allowed to stand for drying again, and the test of waterproofness was likewise carried out again in order to inspect the change of a waterproof performance due to the water spray of 1,500 mm.

(Test of Adhesive Properties)

When water was sprayed on the powdery and granular material in the above-mentioned tests of waterproofness and water resistance, the outflow state of the piled material was observed. Ranking was made by expressions of "better", "good", "modest" and "poor" in order of the less outflow. The evaluation "better" means that outflow was not observed and the running water was colorless; "good" means that a small amount of the powdery material was observed to be washed away; "modest" means that in addition to the powdery material, tiny particles also ran; and "poor" means that the granular material ran like the untreated material and in the extreme case, the pile itself was destroyed.

Further, an outflow amount of the powdery and granular material was measured from a difference between its weight before the spray at the time of the above-mentioned test of water resistance and its weight after the spray and drying. In this case, the water content is unfixed, therefore the obtained values have no strict meaning but can represent film ability to prevent the outflow and destruction of the powdery and granular material because the comparison of the weights was made under the same conditions.

(Dryness)

The evaluation of the above-mentioned water resistance was made about the sufficiently dried film, but this dryness test was carried out by spraying water on the insufficiently dried film to evaluate its performance. That is, after the above-mentioned surface treatment, 100 cc of water was sprayed on the film by the use of the same spray equipment after a predetermined period of time. This amount of water corresponds to a fall of about 23 mm on the piled material. After the film was allowed to stand and dry, the evaluation of the water resistance was likewise made.

EXAMPLE 1

(Preparation of an Aqueous Wax Emulsion (E-1))

| | |
|---|---|
| Slack wax | 12.8 kg |
| (unrefined paraffin, melting point = 48° C., oil content = 1.57%) | |
| Oxygen-containing wax prepared by reacting a hydrocarbon wax with maleic anhydride (Nippon Oil Co., Ltd.; PO Wax H-10 (trade name), acid value = 78, melting point = 69° C., oxygen content = 5.8 wt %) | 0.7 kg |
| Oleic acid | 0.02 kg |
| Morpholine | 0.13 kg |

The above-mentioned components were melted and mixed at 105° C., and 3 kg of water at 95° C. were gradually added thereto in order to prepare an emulsion. After its cooling, water was added thereto for the concentration adjustment, whereby the emulsion containing 45.0% by weight of solids content was prepared. This emulsion E-1 had a viscosity of 26.5 cp (30° C.) and was stable for one year or more, when allowed to stand at ordinary temperature.

(Preparation of an Emulsion for Surface Treatment)

The thus prepared emulsion E-1 and a commercially available polymer component emulsion were mixed with each other so that a solid content might be a predetermined value, and dilution was carried out for the concentration of the whole solid to be 4.0% by weight.

(Surface Treatment of a Stored Coal)

A used sample was coal (water content=9.0%) of New Zealand which had been sifted to remove large masses having a diameter of 10 mm or more. On a woven metallic wire of No. 100, 40 g of the sample coal were made into a pile, and was shaped into a slightly flat hemisphere (diameter=about 75 mm, projected area=about 44 cm$^2$). A predetermined amount of the emulsion was sprayed on the piled material by the use of a spray equipment (Mistmizer; Suga Shikenki Co., Ltd.), and drying was carried out by allowing it to stand.

Conditions of the respective tests and results are set forth in Table 1.

TABLE 1

Effect of surface treatment on piled coal
(base water coal, 10 mm and under, 40 g, projected area = 44 cm$^2$)

| Experimental No. | 1 | 2 | 3 | 4 | 5 | 6 | 7 | 8 | 9 | 10 |
|---|---|---|---|---|---|---|---|---|---|---|
| Surface treating emulsion (solid content = 4 wt %) | Water | Wax E-1 | Wax E-1 | Wax E-1 | Commercial polyvinyl acetate (A) | Commercial polyvinyl acetate (A) | Commercial polyvinyl acetate (A) | Commercial polyvinyl acetate (B) | E-1/(A) = 1/2 | E-1/(A) = 2/1 |
| Amount (cc) | 7.50 | 3.33 | 6.67 | 10.0 | 3.33 | 6.67 | 10.0 | 10.0 | 10.0 | 10.0 |
| Waterproofness (water 40 cc) (water absorption; wt %) | 28.4 | 22.3 | 18.6 | 12.5 | 26.4 | 21.0 | 12.2 | 10.3 | 9.2 | 8.6 |
| Surface repellency | Poor | Good | Better | Better | Poor | Poor | Poor | Poor | Modest | Good |
| Outflow property | Poor | Poor | Modest | Good | Good | Good | Better | Better | Good | Good |
| Water resistance (water 1,500 mm) (water absorption after spray; wt %) | | | | 17.4 | | | 19.8 | 9.5 | 8.0 | 11.4 |

| Experimental No. | 11 | 12 | 13 | 14 | 15 | 16 | 14' |
|---|---|---|---|---|---|---|---|
| Surface treating emulsion (solid content = 4 wt %) | E-1/(B) = 1/3 | E-1/(B) = 2/2 | E-1(B) = 3/1 | E-1(B) = 4/1 | E-1/(B) = 4/1 | E-1/(B) = 4/1 | E-1/(B) = 4/1 |
| Amount (cc) | 10.0 | 10.0 | 10.0 | 10.0 | 10.0 Sprayed | 10.0 Sprayed | 56.8 (400 g |

TABLE 1-continued

Effect of surface treatment on piled coal
(base water coal, 10 mm and under, 40 g, projected area = 44 cm$^2$)

|  |  |  |  |  | after 1 hr | after 2 hr | of coal) |
|---|---|---|---|---|---|---|---|
| Waterproofness (water absorption; wt %) | 7.4 | 6.5 | 8.3 | 11.2 | 8.8 | 7.2 | 3.8 |
| Surface repellency | Poor | Good | Good | Better | Modest | Modest | Better |
| Outflow property | Better | Better | Better | Better | Good | Good | Better |
| Water resistance (water absorption after spray; wt %) | 7.2 | 7.1 | 9.6 | 15.2 | 9.2 | 8.5 | 5.3 |
| Adhesiveness (outflor rate after spray; wt %) | 0 | 0 | 0.4 | 0.7 | 4.6 | 3.5 | 0.2 |

Experimental Nos. 1 to 8 were Comparative Examples.
A: Commercial polyvinyl acetate emulsion (the lowest film-forming temperature = 0° C.)
B: Commercial polyvinyl acetate emulsion (the lowest film-forming temperature = 10° C.)

As seen in Table 1, the untreated sample (which underwent water spray and drying exhibited a water absorption (weight increase) of 28.4% by weight under the conditions set forth in the table, but when subjected to the surface treatment, the value of the water absorption could be remarkably lowered. 10 cc of the emulsion having a concentration of 4% by weight corresponds to 1% by weight of the coal, about 91 g/m$^2$ in projected area, and about 100μ in film thickness (specific gravity of the solid content in the emulsion=0.90). The polyvinyl acetate resin showed repellency and the wax was poor in surface adhesiveness, which fact allowed a small amount of the coal grains to flow out. Although similar types of polyvinyl acetate resins was used, the resins (A) and (B) which were of different makers exhibited some differences in effects. It was found that when the blend of the wax and the polyvinyl acetate resin was employed, such a high quality as could not be obtained from either single component could be gained.

The effect of the emulsion regarding the present invention were maintained even when the water was sprayed equivalent to 1,500 mm of rainfall, though the water resistance was somewhat lowered. Further, in cohnection with Experiments 15 and 16 in which water was sprayed 1 hour and 2 hours after the surface treatment, respectively, the water-resistant performance was unexpectedly highly improved, though cloudy water flowed out and a deterioration in performance was thus supposed. This result is presumed to be due to the uniformization of a treating agent distribution by the water spray. Anyway, it was found that even when 20 mm equivalent water was sprayed 1 hour after the surface treatment, the effects of the films of Experiments 15 and 16 were not lowered.

EXAMPLE 2

In the same manner as in Example 1 with the exception that the slack wax was replaced with the following components, emulsions E-2 and E-3 were prepared.

| A wax component in E-2: | |
|---|---|
| Refined paraffin (melting point = 63° C.; oil content = 0.2% by weight) | 12.8 kg |
| A wax component in E-3: | |
| Slack microwax (unrefined; melting point 79° C.; oil content = 2.3% by weight) | 10.2 kg |
| Slack wax (which was the same as in E-1) | 2.6 kg |

As commercially available polymer emulsions, polyacrylic resin emulsions (C) and (D) were employed as well, effects of surface treatment on the coal are set forth in Table 2.

TABLE 2

Effects of surface treatment on piled coat
(Experiment 23 was a comparative example)

| Experimental No. | 17 | 18 | 19 | 20 | 21 | 22 | 23 |
|---|---|---|---|---|---|---|---|
| Surface treating emulsion (solid content = 4 wt %) | E-2/(B) = 3/1 | E-3/(B) = 3/1 | E-1/(C) = 4/1 | E-1/(C) = 4/1 | E-1/(D) = 3/1 | E-3/(B) = 3/1 | Water |
| Amount (cc) | 10.0 | 10.0 | 10.0 | 7.5 | 10.0 | 10.0 (earth) | 10.0 (earth) |
| Waterproofness (water absorption; wt %) | 15.2 | 5.6 | 9.6 | 13.4 | 19.3 | 13.4 | — |
| Surface repellency | Better | Good | Better | Better | Modest | Better | Poor |
| Outflow property | Good | Better | Better | Modest | Modest | Good | Poor |

Conditions were the same as in Example 1.
(C) Commercial polyacrylic emulsion (the lowest film forming temperature = 15° C.)
(D) Commercial polyacrylic emulsion (the lowest film forming temperature = 45° C.)

EXAMPLE 3

The procedure of Experiment 14 in Example 1 was repeated, but in order to carry out tests on the large scale, an amount of the sample coal was increased up to 400 g. The results are represented by Experimental No. 14' in Table 1.

The piled material was formed into a flat shape having a projected area of about 250 cm$^2$, and it was supposed that even if this value was regarded as its surface area, a large difference therebetween would not be present. In the same manner as in Experiment 14, the piled material was subjected to a surface treatment so that it was coated with 90 g/m² of a solid content.

By scaling up the experiment, the ratio of the surface area to the volume became small and the ratio of the solid content to the coal was thus reduced to 0.57% by weight, but treatment effects were noticeably improved. Particularly in the case of the film having a high water repellency, water did not permeate into and remained on the surface of the piled material, therefore the greater the surface ratio the lower the apparent value of the water-resistant performance.

EXAMPLE 4

A garden earth material was sampled and was formed into a flat shape having a projected area of about 44 cm², and a surface treatment was carried out in the same manner as in Example 2. The results are represented by Experimental No. 22 in Table 2. An untreated earth material for comparison (which underwent water spray; Experimental No. 23) resulted in much an outflow to measure a water absorption, but the treated earth material retained its shape and exhibited water-resistant effect.

Comparative Example 1

As seen in Table 1, the treatment with either a wax emulsion or a polymer emulsion alone could provide fair greater effects as compared with the case where no treatment was given, but in such a single treatment, effects such as the water repellency and outflow were insufficient. After all, the effects of the single treatment were inferior to those of a complex treatment using both the emulsion components.

Comparative Example 2

A commercially available acrylic emulsion (D) (the lowest film forming temperature=45° C.) was employed, and the results are represented by Experimental No. 21 in Table 2. Since effects of the polymer component were not obtained, evaluations were at a low level.

What is claimed is:

1. In a method of surface treatment by applying a surface treating agent to a powdery and granular material stored in the open air, the improvement which comprises said surface treating agent being an emulsion containing 0.5 to 50% by weight of a solid content and water, said solid content comprising (I) 100 parts by weight of a petroleum wax component selected from the group consisting of slack waxes with 1% by weight or more of an oil content, slack microcrystalline waxes with 1% by weight or more of an oil content, paraffin waxes, microcrystalline waxes and mixtures thereof and (II) 5 to 500 parts by weight per 100 parts of petroleum wax component of a polymer component having adhesive properties and the lowest film-forming temperature of 40° C. or less, said polymer being acrylic or vinyl acetate polymer.

2. The method for surface treatment according to claim 1 wherein said polymer component (II) is selected from the group consisting of homopolymers of vinyl acetate, copolymers of the same and other monomers, and mixtures thereof polymer.

3. The method for surface treatment according to claim 1 wherein said polymer component (II) is selected from the group consisting of homopolymers of acrylic acid or acrylic esters, copolymers of the same and other monomers, and mixtures thereof.

4. The method for surface treatment according to claim 1 wherein said polymer component (II) is a copolymer of acrylic acid and an acrylic ester.

5. The method for surface treatment according to claim 1 wherein said petroleum wax has a melting point within the range of 45° to 85° C.

6. The method for surface treatment according to claim 1 wherein said emulsion is emulsified with an emulsifying agent in an amount of 3.0% by weight or less based on the weight of said petroleum wax.

7. The method for surface treating according to claim 1 wherein an oxygen-containing wax is blended in an amount of 2.0 to 20% by weight based on the weight of said petroleum 8. The method for surface treating according to claim 7 wherein said oxygen-containing wax is selected from the group consisting of wax oxides, natural waxes and oxygen-containing waxes prepared by reacting hydrocarbon waxes with maleic anhydride.

9. The method for surface treatment according to claim 7 wherein said oxygen-containing wax is that which is prepared by reacting hydrocarbon wax with maleic anhydride.

10. The method for surface treating according to claim 8 wherein said oxygen-containing-wax is selected from the group consisting of paraffin oxide, polyethylene oxide, carnauba wax and montan wax.

11. The method for surface treatment according to claim 1 wherein said emulsion contains 2-35% by weight of solid content.

12. The method for surface treatment according to claim 11 wherein the amount of polymer component is 15 to 400 parts by weight per 100 parts of petroleum wax component.

13. The method for surface treatment according to claim 12 wherein said solid content comprises slack wax.

14. The method for surface treatment according to claim 12 wherein an oxygen-containing wax is blended in an amount of 2.0 to 20% by weight based on the weight of said petroleum wax component.

15. The method for surface treatment according to claim 14 wherein the amount of oxygen-cotaining wax is 3 to 10%.

16. The method for surface treatment according to claim 15 wherein said oxygen-containing wax is that which is prepared by reacting hydrocarbon wax with maleic anhydride.

17. The method for surface treatment according to claim 16 wherein said petroleum wax component comprises slack wax.

* * * * *